(12) United States Patent
Lee

(10) Patent No.: US 8,730,427 B2
(45) Date of Patent: May 20, 2014

(54) FLAT PANEL DISPLAY APPARATUS

(75) Inventor: Duk-Jin Lee, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 78 days.

(21) Appl. No.: 13/457,299

(22) Filed: Apr. 26, 2012

(65) Prior Publication Data

US 2012/0307430 A1   Dec. 6, 2012

(30) Foreign Application Priority Data

May 30, 2011  (KR) .................. 10-2011-0051662

(51) Int. Cl.
*G02F 1/1333*  (2006.01)

(52) U.S. Cl.
USPC .......................................... 349/58

(58) Field of Classification Search
USPC .......................................... 349/58
See application file for complete search history.

(56) References Cited

U.S. PATENT DOCUMENTS

| | | | |
|---|---|---|---|
| 6,749,587 B2* | 6/2004 | Flaherty | 604/151 |
| 7,965,498 B2* | 6/2011 | Gotham et al. | 361/679.21 |
| 8,026,996 B2* | 9/2011 | Matsuhira et al. | 349/60 |
| 8,430,553 B2* | 4/2013 | Chiang | 362/632 |
| 2008/0151134 A1* | 6/2008 | Huang | 349/25 |
| 2009/0179557 A1 | 7/2009 | Yee et al. | |
| 2011/0242743 A1 | 10/2011 | Moon | |

FOREIGN PATENT DOCUMENTS

| | | |
|---|---|---|
| KR | 10-2009-0079016 | 7/2009 |
| KR | 10-2009-0093058 A | 9/2009 |
| KR | 10-0953654 A | 4/2010 |
| KR | 10-2011-0112124 | 10/2011 |

OTHER PUBLICATIONS

Korean Patent Abstract Publication No. 10-2010-0001275 which corresponds to Korean No. 10-0953654 dated Apr. 20, 2010.

* cited by examiner

*Primary Examiner* — James Dudek
(74) *Attorney, Agent, or Firm* — Christie, Parker & Hale, LLP

(57) ABSTRACT

A flat panel display apparatus including a transparent bezel including a floor part and a sidewall part protruding from the floor part and being capable of transmitting ultraviolet (UV) light, a display panel including a first substrate located on the bezel and having a display unit on one surface thereof and a second substrate facing the first substrate, a transparent window on the bezel, and a resin layer between the second substrate and the transparent window and between the first substrate and the bezel.

10 Claims, 2 Drawing Sheets

FLAT PANEL DISPLAY APPARATUS

CROSS-REFERENCE TO RELATED PATENT APPLICATION

This application claims priority to and the benefit of Korean Patent Application No. 10-2011-0051662, filed on May 30, 2011, in the Korean Intellectual Property Office, the disclosure of which is incorporated herein in its entirety by reference.

BACKGROUND

1. Field

Embodiments of the present invention relate to a flat panel display apparatus.

2. Description of the Related Art

In general, flat panel display devices may be classified into an emissive type and a non-emissive type. The emissive type display devices may include, for example, flat cathode ray tubes, plasma display panels (PDPs), and electroluminescent devices. The non-emissive type display devices may include liquid crystal displays (LCDs). Here, the electroluminescent devices have wide viewing angles, excellent contrast, and rapid response speed, and have thus been recently in the spotlight as a next generation display device. Such an electroluminescent device may be an inorganic electroluminescent device or an organic electroluminescent device as determined by materials used for forming an emission layer.

The organic electroluminescent device is a self-luminous display that electrically excites fluorescent organic compounds, emits light, and has been highlighted as a next generation display device that may be driven with low voltage, may be easily made relatively thin, has a wide viewing angle, and has rapid response speed.

The organic electroluminescent device includes an emission layer that is formed of an organic material and is interposed between an anode and a cathode. As an anode voltage and a cathode voltage are respectively applied to the anode and the cathode, holes injected from the anode move to the emission layer through a hole transport layer, and electrons move from the cathode to the emission layer through an electron transport layer, so that the holes and the electrons recombine in the emission layer to form excitons. The exciton in an excited state transition a ground state so that fluorescent molecules of the emission layer radiate, thereby forming an image (e.g., emitting light). In a full-color type organic electroluminescent device, pixels that emit red R, green G, and blue B color are included to realize full color.

An organic light emitting display apparatus generally includes a display panel including an organic electroluminescent device, a housing in which the display panel is accommodated, and a printed circuit board (PCB) electrically coupled to the display panel through a flexible printed circuit (FPC).

The related art described above has been provided to introduce the present invention or has been learned during the introduction of the present invention, and is not necessarily well-known art that was published prior to the filing of the present application.

SUMMARY

Embodiments of the present invention provide a flat panel display apparatus for increasing hardening efficiency of resin disposed between a bezel and a display panel, thereby enhancing moisture permeability resistance, enhancing impact resistance, and simplifying a manufacturing process.

According to aspects of embodiments of the present invention, there is provided a flat panel display apparatus including a transparent bezel including a floor part and a sidewall part protruding from the floor part and being capable of transmitting ultraviolet (UV) light, a display panel including a first substrate located on the bezel and having a display unit on one surface thereof and a second substrate facing the first substrate, a transparent window on the bezel, and a resin layer between the second substrate and the transparent window and between the first substrate and the bezel.

The resin layer may surround at least a part of the display panel.

The resin layer may be between a side surface of the display panel and the sidewall part of the bezel.

The resin layer may include optical bonding resin.

The resin layer may include resin hardened by at least one of irradiating UV light onto the resin or heating the resin.

The resin layer may be between the first substrate and the floor part of the bezel for adhering the first substrate to the floor part of the bezel.

The bezel may include polymethylmethacrylate (PMMA).

An average value of UV light transmittance of the bezel may be greater than 50% in a section having a thickness in a range of 280-400 nm.

The flat panel display apparatus may further include a driver IC on one side of the first substrate or the second substrate, and a flexible printed circuit board (FPCB) electrically coupled to the driver IC.

BRIEF DESCRIPTION OF THE DRAWINGS

The above and other aspects of embodiments of the present invention will become more apparent by describing in detail exemplary embodiments thereof with reference to the attached drawings in which.

DETAILED DESCRIPTION

Hereinafter, one or more embodiments of the present invention will be described more fully with reference to the accompanying drawings.

Figure 1:
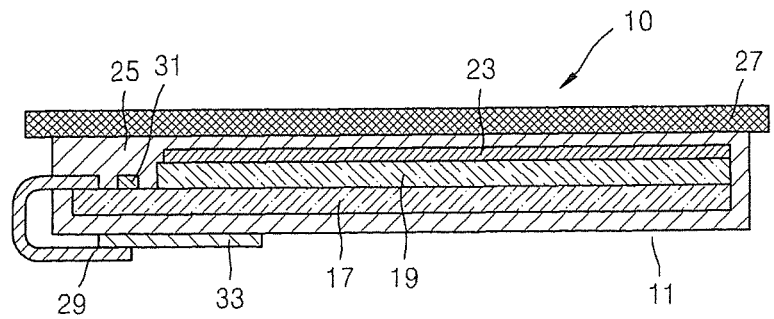
FIG. 1 is a cross-sectional view of a conventional flat panel display apparatus.

FIG. 1 is a cross-sectional view of a conventional flat panel display apparatus 10.

Referring to FIG. 1, the conventional flat panel display apparatus 10 includes a bezel 11, a first substrate 17, a second substrate 19, a polarizing plate 23, a resin layer 25, a transparent window 27, a driver IC 31, a printed circuit board (PCB) 33, and a flexible PCB (FPCB) 29.

More specifically, the first substrate 17 and the second substrate 19 that face each other are coupled to each other by a sealing portion (not shown). The polarizing plate 23 is on a top portion of the second substrate 19. The first substrate 17, the second substrate 19, and the polarizing plate 23 are accommodated in the bezel 11. The resin layer 25 is above the first substrate 17, the second substrate 19, and the polarizing plate 23, and the transparent window 27 is on a top portion of the resin layer 25. In this regard, the resin layer 25 is formed by coating resin between the polarizing plate 23 and the transparent window 27 and hardening the resin, for example, by irradiation of ultraviolet (UV) (e.g., UV light).

Meanwhile, the driver IC 31 for driving a display unit 115 (for example, see FIG. 3) is at one side of the first substrate 17 or the second substrate 19. The PCB 33 includes electronic devices for processing a driving signal, and includes a connector for receiving an external signal, and is on an outer surface of the bezel 11. Meanwhile, one side of the FPCB 29 is coupled to the first substrate 17, and another side thereof is coupled to the PCB 33. That is, the FPCB 29 electrically couples the PCB 33 and the display unit 115 on the first substrate 17. Thus, the driving signal generated in the PCB 33 is transferred to the driver IC 31 through the FPCB 29.

As described above, the conventional flat panel display apparatus 10 generally uses an opaque bezel formed of a metal material. However, in this case, the opaque bezel-like metal needs UV light irradiation having high energy for a long period of time to harden the resin layer 25 in a shade region covered by the bezel 11. Moreover, the resin layer 25 in the shade region covered by the bezel 11 is not completely hardened, which deteriorates moisture permeability resistance and impact resistance of the conventional flat panel display apparatus 10. Meanwhile, the first substrate 17 and the bezel 11 are coupled to each other by using an adhesive layer (for example, a tape), and no resin layer is generally located therebetween. In this case, the first substrate 17 and the bezel 11 need the adhesive layer (for example, the tape), and thus a manufacturing process becomes complicated and the manufacturing cost increases.

To solve these problems, a flat panel display apparatus of an embodiment of the present invention uses a transparent bezel capable of UV light transmittance, and includes a resin layer between the bezel and a substrate so that the resin layer wholly surrounds a display panel and serves as an adhesive agent for coupling the bezel and the substrate. This will now be described in more detail.

Figure 2:
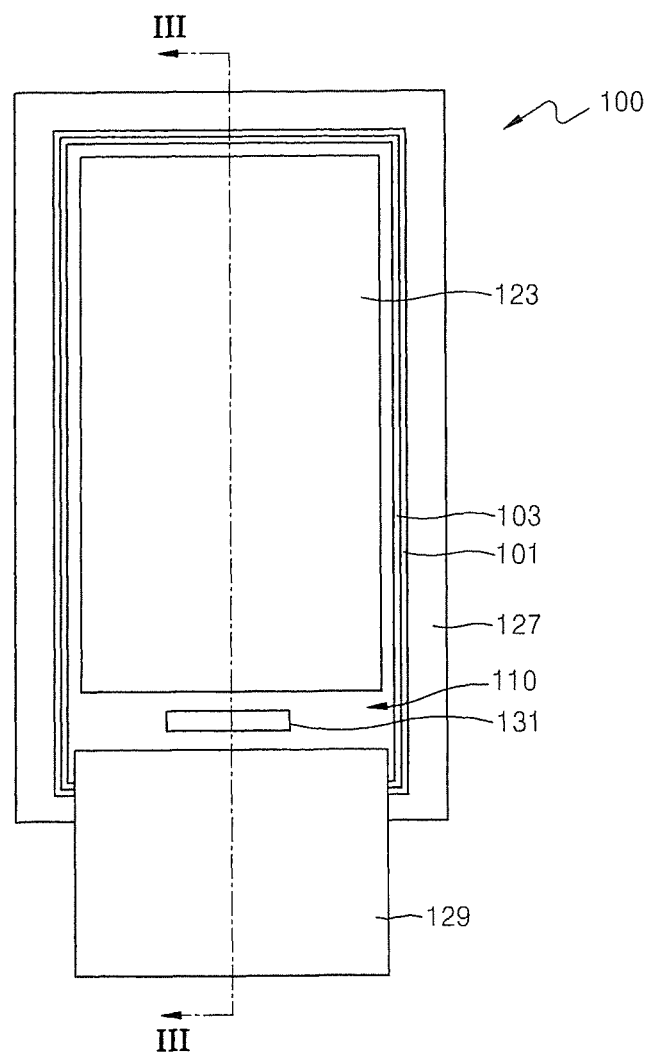
FIG. 2 is a cross-sectional view of a flat panel display apparatus according to an embodiment of the present invention.
Figure 3:
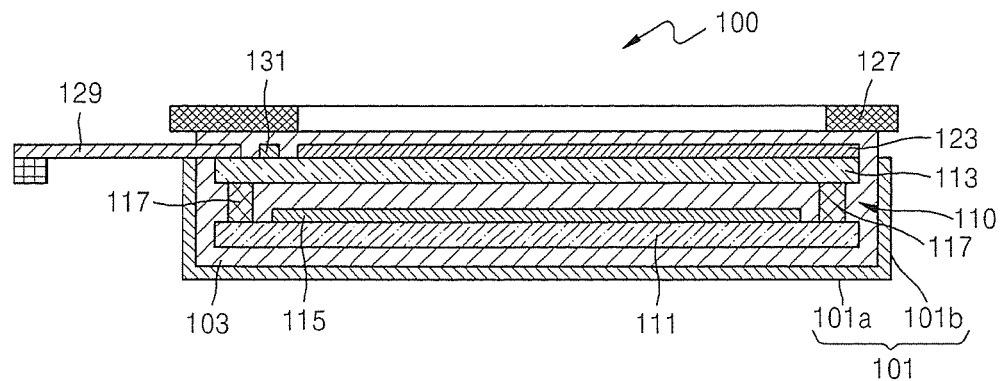
FIG. 3 is a cross-sectional view of the flat panel display apparatus of the embodiment shown in FIG. 2 taken along the line III-III.

FIG. 2 is a cross-sectional view of a flat panel display apparatus 100 according to an embodiment of the present invention. FIG. 3 is a cross-sectional view of the flat panel display apparatus 100 of the embodiment shown in FIG. 2 taken along the line III-III.

Referring to FIGS. 2 and 3, the flat panel display apparatus 100 of the present embodiment includes a display panel 110 including a first substrate 111, a second substrate 113, a display member 115, a sealing unit 117, a bezel 101, a resin layer 103, a polarizing plate 123, a transparent window 127, a FPCB 129, and a driver IC 131.

More specifically, the bezel 101 forms an outer shape of the flat panel display apparatus 100 and includes the display panel 110 therein. In this regard, the bezel 101 includes a floor portion (e.g., floor part) 101a and a sidewall portion (e.g., sidewall part) 101b. The floor portion 101a is parallel to the first substrate 111 of the display panel 110. That is, the display panel 110 is accommodated in the bezel 101 in such a way that the first substrate 111 is placed on the floor portion 101a. The sidewall portion 101b protrudes from the floor portion 101a and surrounds side surfaces of the first substrate 111 and the second substrate 113.

Meanwhile, the display panel 110 includes the first substrate 111 and the second substrate 113 that face each other, and the sealing unit 117 for coupling the first substrate 111 and the second substrate 113 to each other. The display unit 115 including an organic light emitting device is on the first substrate 111. In this regard, the first substrate 111 may be a transparent glass material having $SiO_2$ as a main component. However, the first substrate 111 is not limited thereto, and may also be formed of a transparent plastic material. Meanwhile, the second substrate 113 is adhered to a top portion of the first substrate 111 on which the display unit 115 is located. The second substrate 113 may be formed of, for example, various plastic materials, such as acryl, and may also be formed of glass and/or metal. The first substrate 111 and the second substrate 113 are adhered to each other by using the sealing unit 117. The sealing unit 117 may use a commonly used material such as a sealing glass frit.

In this regard, the display panel 1110 may be a top emissive type in which an image is formed toward the transparent window 127. Alternatively, when the bezel 101 is formed of a transparent material, such as the present embodiment, the display panel 110 may be a bottom emissive type in which the image is formed toward the first substrate 111. Further, the display panel 110 may be a dual emissive type in which the image is formed in both the direction of the transparent window 127 and the direction of the first substrate 111.

Meanwhile, the polarizing plate 123 is on a top portion of the second substrate 113. The resin layer 103 is formed inside the bezel 101 to surround (substantially surround or entirely surround) the display panel 110 and the polarizing plate 123. The transparent window 127 is in (e.g., over or next to) a top portion of the bezel 101. In this regard, the polarizing plate 123 is not an indispensable constituent, and may be omitted. The transparent window 127 may include a light shielding portion corresponding to the boundary of the display panel 110, and a transmission portion corresponding to a center portion of the display panel 110. That is, the light shielding portion corresponds to the boundary of the display panel 110, and the transmission portion corresponds to the center portion of the display panel 110. The light shielding portion may shield unnecessary light, and may cover a portion of the display panel 110 that does not display the image.

Meanwhile, the driver IC 131 for driving the display unit 115 is on a portion (e.g., a top portion) of one side of the first substrate 111 or the second substrate 113. Although the driver IC 131 is on the top portion of the second substrate 113 in FIG. 3, the present invention is not limited thereto. The driver IC 131 may be on the top portion of the first substrate 111. The FPCB 129 is formed near one side of the driver IC 131 and is electrically coupled to the driver IC 131. A PCB (not shown) is further coupled to one side of the FPCB 129. Thus, a driving signal generated in the PCB (not shown) may be transferred to the driver IC 131 through the FPCB 129.

In this regard, the flat panel display apparatus 100 of the present embodiment uses the transparent bezel 101 capable of UV light transmittance, and includes the resin layer 103 located between the bezel 101 and the first substrate 111 so that the resin layer 103 wholly surrounds the display panel 110.

More specifically, the resin layer 103 is located between the transparent window 127 and the polarizing plate 123 to enhance characteristics relating to brightness, transmittance, reflectivity, and visibility of the flat panel display apparatus 100. In addition, the resin layer 103 of the present embodiment serves as an adhesion layer for adhering the first substrate 111 of the display panel 110 and the floor portion 101a of the bezel 101. In other words, the resin layer 103 may fill in at least a part of spaces between the transparent window 127 and the second substrate 113 (or between the transparent window 127 and the polarizing plate 123 on the top portion of the second substrate 113), between the floor portion 101a of the bezel 101 and the first substrate 111, and/or between the sidewall portion 101b of the bezel 101 and side surfaces of the first and second substrates 111 and 113. In this regard, a refractive index of the resin layer 103 may be similar to that of the transparent window 127. Since the resin layer 103 fills in the space between the second substrate 113 and the transparent window 127, if the refractive index is similar between the resin layer 103 and the transparent window 127, reflection of light due to a difference in the refractive index is reduced.

In this regard, in order for the resin layer 103 to serve as the adhesion layer for adhering the first substrate 111 of the display panel 110 and the floor portion 101a of the bezel 101, the resin layer 103 of the flat panel display apparatus 100 of the present embodiment may include optical bonding resin. That is, the resin layer 103 may be formed of an adhesive material wherein light causes the material to harden in a resin status. As such, the resin layer 103 is formed to include the optical bonding resin, which does not need an additional adhesion layer between the bezel 101 and the display panel 110, thereby reducing manufacturing cost, and reducing a processing time. The resin layer 103 is formed to surround (e.g., substantially surround or entirely surround) the display panel 110, which enhances moisture permeability resistance and impact resistance, thereby increasing mechanism reliability.

As described above, the resin layer 103 is formed by coating resin on the inside of the bezel 101 when the display panel 110 is accommodated in the bezel 101, and hardening the resin by irradiation of UV light. To form the resin layer 103 by hardening the resin coated on the inside of the bezel 101, a sufficient amount of UV light must be irradiated onto the resin coated on the inside of the bezel 101. However, when a bezel is formed of opaque metal, such as in the conventional art, a resin layer in a shade region (for example, in a region between the bezel and a first substrate) covered by the bezel is not completely hardened, which deteriorates moisture permeability resistance and impact resistance of a flat panel display apparatus.

Therefore, the bezel 101 of the present embodiment is formed of a transparent material capable of transmitting UV light. In this regard, the UV light transmittance of the bezel 101 may be greater than 50% on the average with respect to 280-400 nm of a wavelength band corresponding to UV light, further greater than 70% on the average.

Figure 4:
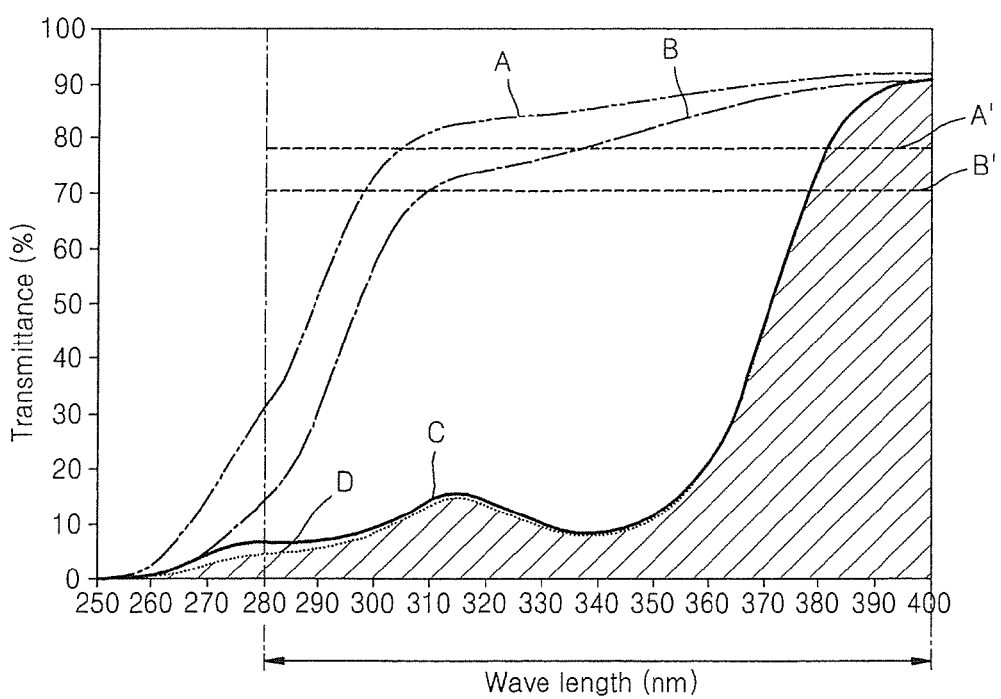
FIG. 4 is a graph showing a UV light transmittance of bezel in the flat panel display apparatus of the embodiment shown in FIG. 2.

FIG. 4 is a graph showing a UV light transmittance of a bezel in the flat panel display apparatus of the embodiment shown in FIG. 2. Referring to FIG. 4, A and B indicate UV light transmittance of a bezel material suitable for being applicable to embodiments of the present invention, and A' and B' indicate average values in sections of 280-400 nm of A and B, and C and D indicate UV light transmittance of a bezel material unsuitable for being applicable to embodiments of the present invention. In this regard, A, B, C, and D materials used as a transparent bezel may be polymethylmethacrylate (PMMA). The materials corresponding to A and B, and the materials corresponding to C and D, may have the same physical properties, such as specific gravity, mechanical intensity, chemical characteristics (e.g., chemical makeup), moisture absorption, etc. and may have different spectrum transmittance in a single wavelength band by changing an additive added to the PMMA.

As shown in FIG. 4, averages of the UV light transmittance of the bezel materials corresponding to A and B are 78.3% and 70.3%, respectively. When the bezel materials A and B are used to form the transparent bezel, UV light may transmit through the transparent bezel, and can be sufficiently irradiated onto a resin layer, thereby reducing a UV irradiation time, reducing energy necessary for generating UV light, reducing a processing time, and/or reducing damage of a display panel due to UV irradiation. Contrastingly, when the bezel materials C and D are used to form the bezel, UV light having high energy is irradiated for a long period of time. Furthermore, the resin layer in a shade region covered by the bezel is not completely hardened, which deteriorates moisture permeability resistance and impact resistance of the flat panel display apparatus.

According to embodiments of the present invention, moisture permeability resistance and impact resistance of a flat panel display apparatus are enhanced, a manufacturing process is simplified, and the manufacturing cost is reduced.

While the present invention has been particularly shown and described with reference to exemplary embodiments thereof, it will be understood by those of ordinary skill in the art that various changes in form and details may be made therein without departing from the spirit and scope of the present invention as defined by the following claims and equivalents thereof.

What is claimed is:

1. A flat panel display apparatus comprising:
 a transparent bezel comprising:
  a floor part at a bottom exterior of the flat panel display apparatus; and
  a sidewall part protruding from the floor part, and being capable of transmitting ultraviolet (UV) light;
 a display panel comprising:
  a first substrate located on the bezel and having a display unit on one surface thereof; and
  a second substrate facing the first substrate;
 a transparent window on the bezel; and
 a resin layer between the second substrate and the transparent window, and between the first substrate and the bezel.

2. The flat panel display apparatus of claim 1, wherein the resin layer surrounds at least a part of the display panel.

3. The flat panel display apparatus of claim 1, wherein the resin layer is between a side surface of the display panel and the sidewall part of the bezel.

4. The flat panel display apparatus of claim 1, wherein the resin layer comprises optical bonding resin.

5. The flat panel display apparatus of claim 1, wherein the resin layer comprises resin hardened by at least one of irradiating UV light onto the resin or heating the resin.

6. The flat panel display apparatus of claim 1, wherein the resin layer is between the first substrate and the floor part of the bezel for adhering the first substrate to the floor part of the bezel.

7. A flat panel display apparatus comprising:
 a transparent bezel comprising:
  a floor part; and
  a sidewall part protruding from the floor part, and being capable of transmitting ultraviolet (UV) light;
 a display panel comprising:
  a first substrate located on the bezel and having a display unit on one surface thereof; and
  a second substrate facing the first substrate;
 a transparent window on the bezel; and
 a resin layer between the second substrate and the transparent window, and between the first substrate and the bezel, wherein the bezel comprises polymethylmethacrylate (PMMA).

8. A flat panel display apparatus comprising:
 a transparent bezel comprising:
  a floor part; and
  a sidewall part protruding from the floor part, and being capable of transmitting ultraviolet (UV) light;

a display panel comprising:
   a first substrate located on the bezel and having a display unit on one surface thereof; and
   a second substrate facing the first substrate;
a transparent window on the bezel; and
a resin layer between the second substrate and the transparent window, and between the first substrate and the floor part of the bezel for adhering the first substrate to the floor part of the bezel, wherein an average value of UV light transmittance of the bezel is greater than 50% in a section having a thickness in a range of 280-400 nm.

9. The flat panel display apparatus of claim 1, further comprising:
   a driver IC on one side of the first substrate or the second substrate; and
   a flexible printed circuit board (FPCB) electrically coupled to the driver IC.

10. The flat panel display apparatus of claim 1, wherein the sidewall part of the transparent bezel surrounds side surfaces of the first and second substrates.

* * * * *